UNITED STATES PATENT OFFICE.

GERHARD NICOLAAS VIS, OF SCHWEIZERHALLE, SWITZERLAND.

PROCESS OF PURIFYING BRINE.

SPECIFICATION forming part of Letters Patent No. 642,023, dated January 23, 1900.

Application filed December 5, 1899. Serial No. 739,254. (No specimens.)

*To all whom it may concern:*

Be it known that I, GERHARD NICOLAAS VIS, a subject of the Queen of the Netherlands, residing at Schweizerhalle, near Basle, Switzerland, have invented a new Process for the Purification of Brine; and I do hereby declare that the following is a full, clear, and exact description of the invention, which will enable others skilled in the art to which it appertains to make and use the same.

This invention relates to the purification of brine, and has for its object to enable the removal of the calcium and magnesium salts from the brine to be effected in a simpler and more efficacious manner than heretofore. For this purpose the present invention essentially consists in electrolytically acting upon the brine by means of a current of such strength as will not affect the calcium and magnesium salts present, but will only be sufficient to decompose part of the sodium chlorid. Under the action of such a current sodium hydroxid is produced, and this in its turn will react with the calcium and magnesium salts present, transforming them into calcium and magnesium hydroxids, which separate out, and combining itself with the acid components of the said salts. Obviously the action of the current has to be so conducted that only such a proportion or a slightly-greater proportion of sodium chlorid is decomposed as will correspond to the proportion of calcium and magnesium salts present in the brine. The calcium and magnesium hydroxids separated out are allowed to settle, when they are separated from the brine by means of a filter-press. The filtered brine is then freed from the small proportion of calcium hydroxid, which has become redissolved during the settling by passing a current of carbonic acid into the brine, whereby the redissolved quantity of hydroxid is precipitated in the form of carbonate, which after settling is removed by means of filter-pressing. In carrying out this carbonation care must be taken not to apply an excess of carbonic acid, as this would cause the formation of soluble bicarbonates. To avoid this, the current of carbonic acid is cut off as soon as a sample taken from the brine under treatment does not become any more turbid by the treatment with carbonic acid nor on boiling. The brine is then allowed to stand until the deposit, which is first of a flaky nature, has been transformed into a fine granular or pulverulent mass more adapted for filtration, which will require a standing of about twenty-four hours.

The mixture of calcium and magnesium hydroxids obtained may be utilized for the manufacture of magnesium salts—for instance, by treating the filtered-off deposit with sulfuric acid as need not be described for those skilled in the art.

The chlorin obtained in the first or electrolyzing step of the process may be collected and used for producing bleaching-powder or other useful products.

If desired, the deposited mixture of calcium and magnesium hydroxids may not be separated from the brine prior to treatment with carbonic acid, but the latter may be directly applied after the current has been cut off. In this case the precipitate consists in a mixture of calcium and magnesium carbonates, which is allowed to stand to render it more apt for filtration. This mode of operation is especially advantageous in cases where the brine contains a small percentage of magnesium salts which it is not desired to remove. In this case only so much chlorid of sodium will be decomposed as corresponds to the proportion of calcium salts present, and the carbonic acid applied immediately after the current has been cut off.

In carrying out the present invention, for instance, with the brine of Schweizerhalle, near Basle, Switzerland, I proceed as follows: In a suitable vessel one cubic meter of brine is acted upon by a current having 2.4 to five volts and two hundred and thirty amperes for ten hours or about, when a current of carbonic acid is passed into the brine until a filtered sample of the latter remains clear on the addition of carbonic acid or on boiling. Then the brine is allowed to stand, the deposit removed by filtration, and the purified brine evaporated.

What I claim as my invention is—

The process of purifying brine which consists in passing through the brine an electric current not sufficient to decompose the calcium and magnesium salts present, but sufficient only to produce sodium hydroxid by decomposing part of the sodium chlorid, allowing the sodium hydroxid to decompose the calcium and magnesium salts present, and removing the redissolved portion of calcium hydroxid by means of carbonic acid, substantially as and for the purpose described.

In testimony whereof I have hereunto set my hand in presence of two subscribing witnesses.

GERHARD NICOLAAS VIS.

Witnesses:
GEORGE GIFFORD,
JOHN G. PLATNER.